(12) United States Patent
Horng

(10) Patent No.: US 6,310,415 B1
(45) Date of Patent: Oct. 30, 2001

(54) BEARING STRUCTURES FOR A MOTOR ROTOR

(75) Inventor: Alex Horng, Kaohsiung (TW)

(73) Assignee: Sunonwealth Electric Machine Industry Co., Ltd. (TW)

( * ) Notice: Subject to any disclaimer, the term of this patent is extended or adjusted under 35 U.S.C. 154(b) by 0 days.

(21) Appl. No.: 09/472,790

(22) Filed: Dec. 28, 1999

(51) Int. Cl.[7] .................................................. H02K 5/16
(52) U.S. Cl. ........................ 310/90; 310/67 R; 384/100; 384/107
(58) Field of Search ................................ 310/90, 67 R; 360/99.08, 98.08; 384/100, 107, 115

(56) References Cited

U.S. PATENT DOCUMENTS

| | | | |
|---|---|---|---|
| 5,715,116 | * 2/1998 | Moritan et al. | 360/99.08 |
| 6,023,114 | * 2/2000 | Mori et al. | 310/90 |
| 6,084,328 | * 7/2000 | Yamashita et al. | 310/90 |
| 6,147,424 | * 11/2000 | Gomyo et al. | 310/90 |

* cited by examiner

Primary Examiner—Nestor Ramirez
Assistant Examiner—Thanh Lam
(74) Attorney, Agent, or Firm—Bacon & Thomas PLLC

(57) ABSTRACT

A bearing structure for a motor rotor includes an outer periphery with an engaging portion tightly engaged to an inner periphery of an axle tube. The bearing structure further includes an axle hole for pivotally supporting a shaft of the motor rotor. A longitudinal length of the axle hole is longer than that of the engaging portion or a longitudinal length of the axle hole is longer than that of a connecting member interconnected between inner periphery of an axle tube and outer periphery of the bearing.

12 Claims, 4 Drawing Sheets

BEARING STRUCTURES FOR A MOTOR ROTOR

BACKGROUND OF THE INVENTION

1. Field of the Invention

The present invention relates to bearing structures for a motor rotor, wherein a bearing structure with an axle hole is pressed and tightly fitted into an axle tube without causing deformation in an inner periphery defining the axle hole. A shaft of the rotor pivotally supported in the axle holes of the bearing may rotate smoothly without deviation.

2. Description of the Related Art

FIGS. 1 and 2 of the drawings illustrate a conventional motor rotor having a shaft 91, a bearing 92, and an axle tube 93. The bearing 92 is generally an oil-pregnant copper bearing or non-ball type bearing. The bearing 92 is pressed into an interior of the axle tube 93 so as to be tightly engaged to an inner periphery of the axle tube 93. The inner periphery radial deformation occurs during forced fitting of the bearing 92. Adverse affection to rotation of the shaft 91 of the rotor occurs even though the deformation is very minor. As a result, rotational noise is generated and the motor operating life is shortened. More specifically, the length of the inner periphery of the bearing 92 is approximately the same as that of the outer periphery of the bearing 92 such that when the bearing is forced fitting into the axle tube 93, the inner periphery 94 defining the axle hole of the bearing 93 resulted in irregular deformation. As a result, smooth surface of the shaft 91 becomes in contact with deformed inner periphery 94 of the axle hole of the bearing 92. Accordingly, noise is generated during rotation of the shaft 91 and the motor operating life is shortened.

SUMMARY OF THE INVENTION

It is a primary object of the present invention to provide a bearing structure that solves the above-mentioned problems. This object is achieved by means of reducing deformation of the bearing in the axle tube, thereby providing smooth rotation for the shaft of the rotor.

A bearing structure in accordance with the present invention includes an outer periphery with an engaging portion tightly engaged to an inner periphery of an axle tube. The bearing structure further includes an axle hole for pivotally supporting a shaft of the motor rotor. A longitudinal length of the axle hole is greater than that of the engaging portion. Thus, when the bearing is engaged into the axle tube, minor deformation is generated in the inner periphery of the bearing corresponding to the engaged area between the inner periphery of the axle tube and the engaging portion, thereby providing smooth rotation for the central axle of the rotor.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
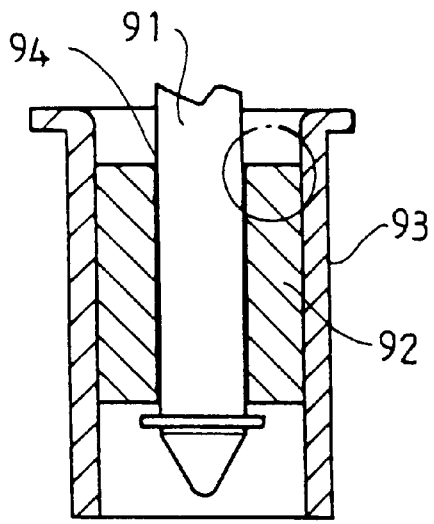
FIG. 1 is a sectional view of a conventional bearing structure for a motor rotor.
Figure 2:
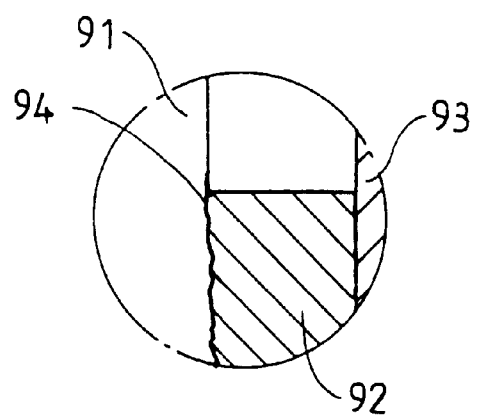
FIG. 2 is an enlarged view of a circle in FIG. 1.
Figure 3:
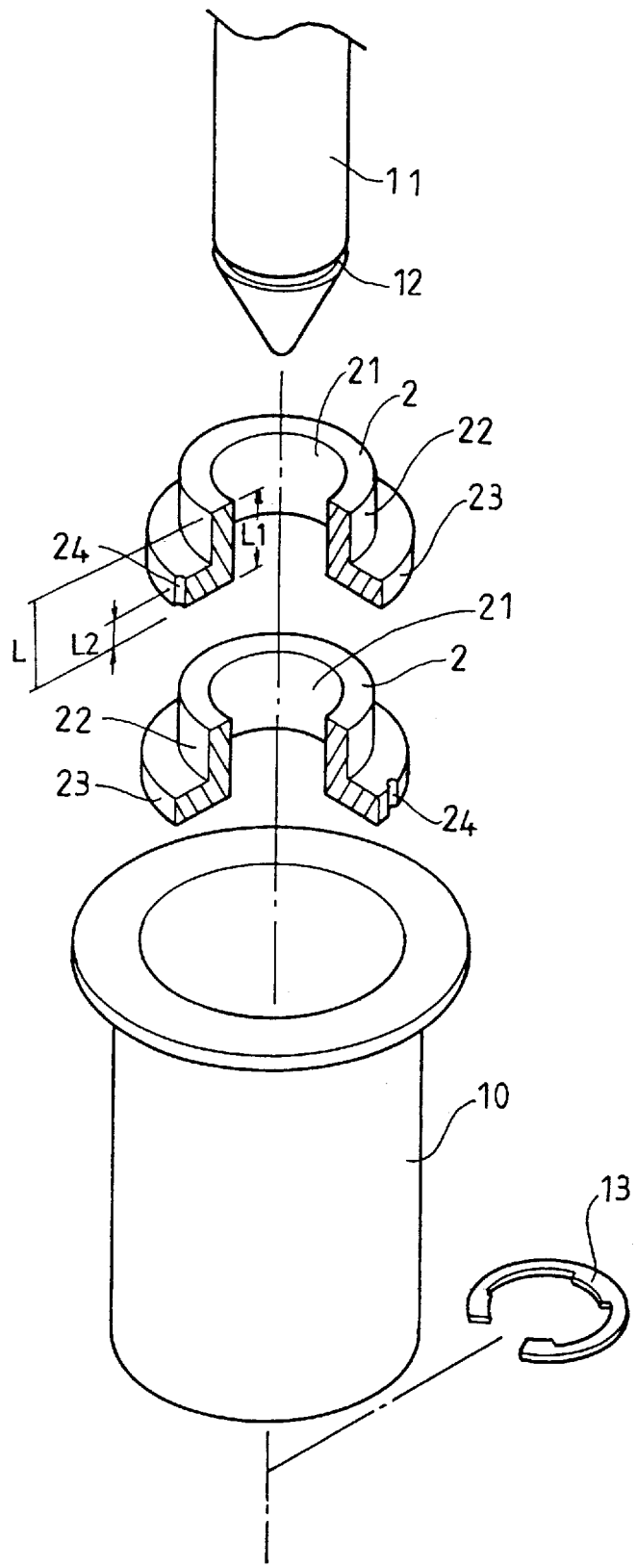
FIG. 3 is an exploded perspective view, partly cutaway, of a (first) embodiment of a bearing structure for a motor rotor in accordance with the present invention.

The present invention will be described below with reference to FIGS. 3 through 7. Referring to FIG. 3, a first embodiment of a bearing structure for a motor rotor in accordance with the present invention generally includes two bearings 2 tightly engaged onto an inner periphery of an axle tube 10. Each bearing 2 includes an axle hole with an inner periphery 21 for pivotally supporting a shaft 11 of a rotor. The shaft 11 includes an annular groove 12 for receiving a retainer 13 (e.g., a C-clip) that retains the shaft 11 in place.

The bearing 2 may be an oil-impregnated bearing, copper bearing, or a non-ball type bearing. As mentioned above, the inner periphery 21 of each bearing 2 defines the axle hole. In addition, each bearing 2 includes an engaging portion 23 of a rim formed on an outer periphery 22 thereof. The inner periphery 21 defining the axle hole of an uniform diameter has a longitudinal length of "L1". The engaging portion 23 of the bearing 2 has a larger diameter than that of the outer periphery 22 of the bearing 2. The engaging portion 23 is used to tightly engage with the axle tube 10 and has a longitudinal length of "L2". The engaging portion 23 includes at least one longitudinally extending groove 24 for providing a flow path for lubrication oil. The grooves 24 on the engaging portion 23 of bearings 2 are not aligned with each other to provide multiple flow paths (not single linear flow path) for the lubrication oil.

It is noted that the longitudinal length "L1" of the axle hole of each bearing 2 is longer than the longitudinal length "L2" of the engaging portion 23 of each bearing 2. Thus, when the engaging portion 23 of each bearing 2 is forced fitting onto the inner periphery of the axle tube 10, the compressed engaging portion 23 merely exerts a force to a corresponding area on the inner periphery of the axle tube 10. As a result, a minor deformation is generated in the inner periphery 21 of the bearing 2 corresponding to the engaged area between the inner periphery of the axle tube and the engaging portion 23. Namely, the inner periphery 21 of the bearing 2 is slightly deformed in the area corresponding to the engaging portion 23. Thus, the shaft 11 rotates in a smoother manner in the axle holes of the bearings 2.

Figure 4:
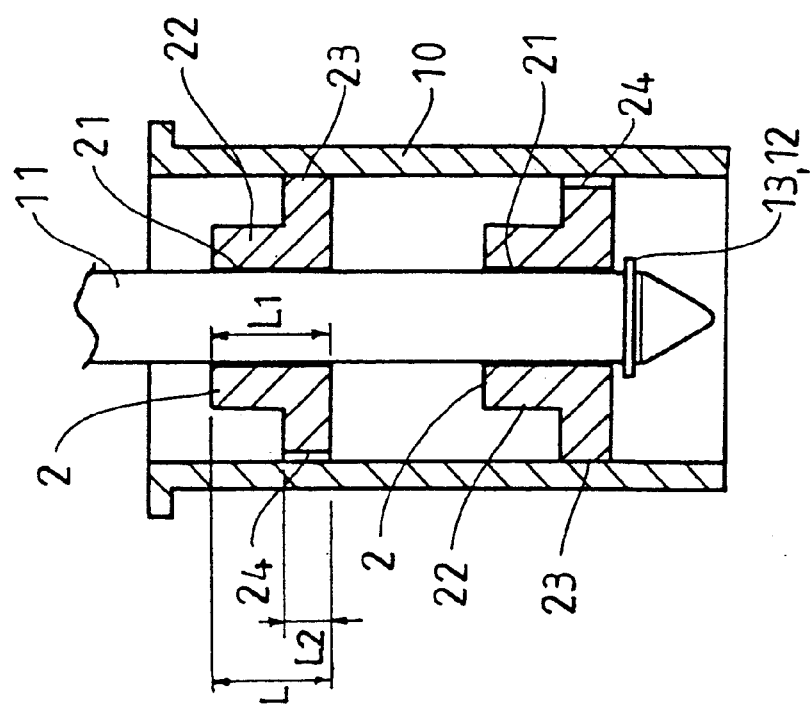
FIG. 4 is a sectional view of the bearing structure for a motor rotor in FIG. 3.

FIG. 4 illustrates a sectional view of the first embodiment of the bearing structure for a motor rotor. The engaging portion 23 of each of two bearings 2 is tightly secured to the inner periphery of the axle tube 10. The axle holes of the bearings 2 provide rotational support for the shaft 11. Since the inner periphery of each bearing 2 merely deforms slightly in the area corresponding to the engaging portion 23 and no deformation occurs in the inner periphery of each bearing 2 in the area other than the area corresponding to the engaging portion 23, the shaft 11 rotates in a smoother manner in the axle holes of the bearings 2. Rotational noise is thus reduced. The grooves 24 on the engaging portion 23 of bearings 2 are not aligned with each other to provide multiple flow paths for the lubrication oil.

Figure 5:
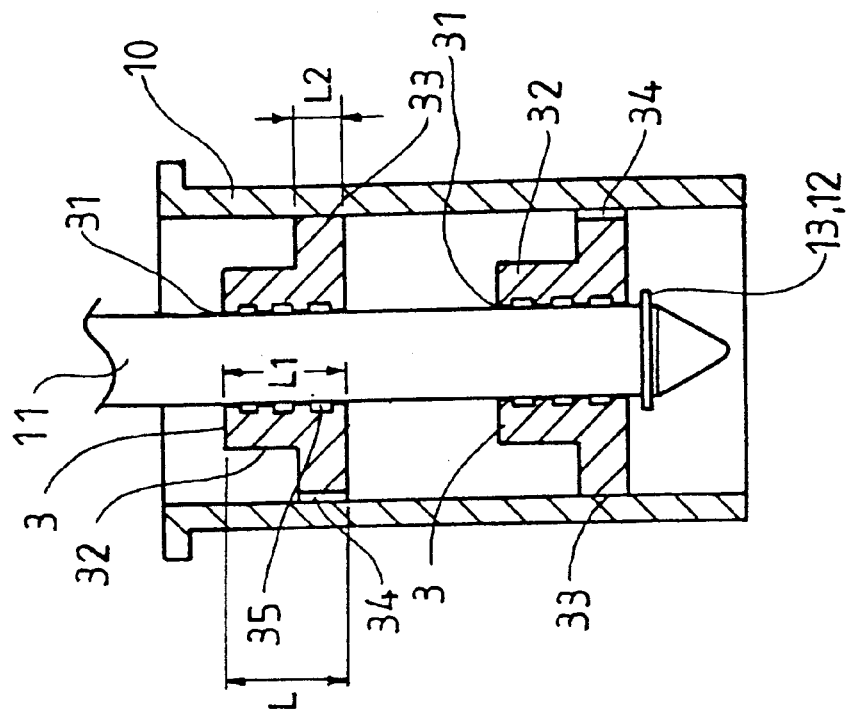
FIG. 5 is a sectional view similar to FIG. 4, illustrating a second embodiment of the bearing structure in accordance with the present invention.

FIG. 5 illustrates a sectional view of a second embodiment of the bearing structure for a motor rotor. In this embodiment, each bearing 3 also has an engaging portion 33 of a rim on an outer periphery 32 thereof so as to be tightly secured to the inner periphery of the axle tube 10. Again, the longitudinal length "L1" of the axle hole of each bearing 3 is longer than the longitudinal length "L2" of the engaging portion 33 of each bearing 3. In addition, the inner periphery 31 defining the axle hole of each bearing 3 includes a plurality of annular grooves 35 to reduce contact area between the bearing 3 and the shaft 11, thereby reducing the rotational noise. The annular grooves 35 may accommodate impurities in the lubrication oil. The engaging portion 33 on each bearing 3 includes a longitudinally extending groove 34. The grooves 34 on the bearings 3 are not aligned with each other to provide multiple flow paths for the lubrication oil.

Figure 6:
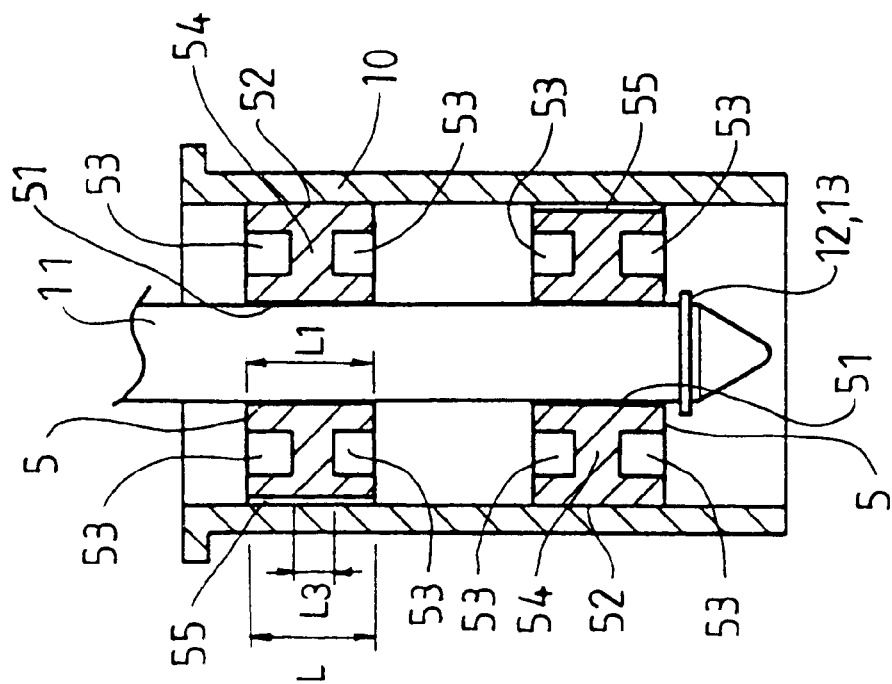
FIG. 6 is a sectional view similar to FIG. 4, illustrating a third embodiment of the bearing structure in accordance with the present invention.

FIG. 6 illustrates a sectional view of a. third embodiment of the bearing structure for a motor rotor. In this embodiment, each bearing 4 includes an inner wall 41 surrounding the axle hole, and the bearing 4 also has an engaging portion 43 of a rim at a middle of an outer periphery 42 thereof so as to be tightly secured to the inner periphery of the axle tube 10. Again, the longitudinal length "L1" of the axle hole of each bearing 4 is longer than the longitudinal length "L2" of the engaging portion 43 of each bearing 4. The engaging portion 43 on each bearing 4 includes a longitudinally extending groove 44. The grooves 44 on the bearings 4 are not aligned with each other to provide multiple flow paths for the lubrication oil.

Figure 7:
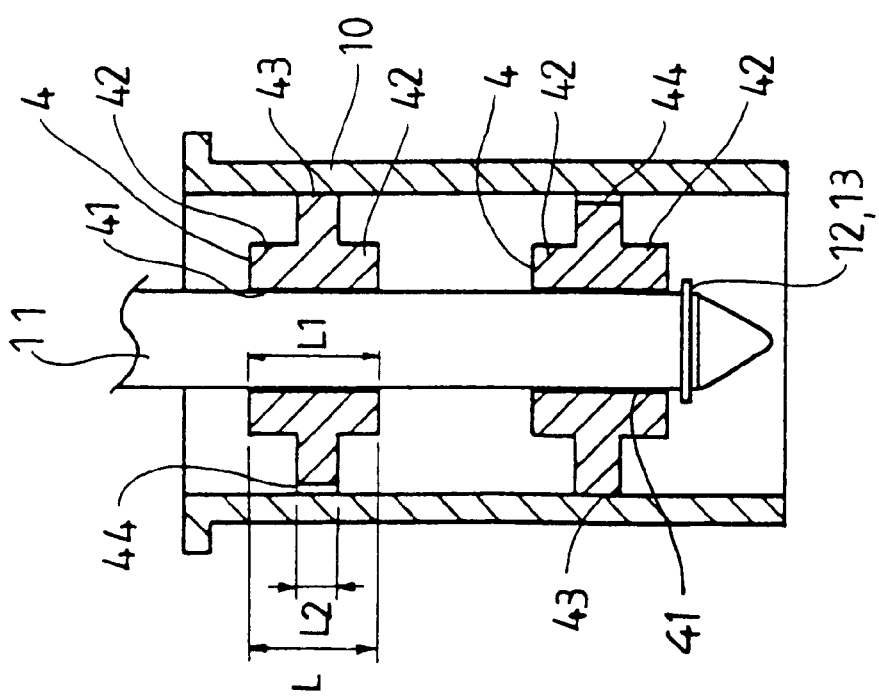
FIG. 7 is a sectional view similar to FIG. 4, illustrating a fourth embodiment of the bearing structure in accordance with the present invention.

FIG. 7 illustrates a sectional view of a fourth embodiment of the bearing structure for a motor rotor. In this embodiment, each bearing 5 includes an innerwall 51 defining an axle hole therein, an outer wall 52, and a connecting member 54 as a rim interconnected between the inner wall 51 and the outer wall 52, thereby defining upper and lower annular grooves 53. The longitudinal length "L1" of the axle hole defined by the inner wall 51 of each bearing 5 is the same as the longitudinal length "L" of the outer wall 52 of each bearing 5. The longitudinal length "L1" of the axle hole of each bearing 5 is longer than the longitudinal length "L3" of the connecting member 54 of each bearing 5. Thus, when the outer wall 52 of each bearing 5 is forced fitting onto the inner periphery of the axle tube 10, compression force from the outer wall 52 of the bearing 5 is transmitted to the inner wall 51 only corresponding to the connecting member 54. As a result, the shaft 11 pivotally supported by the inner periphery 51 defining the axle hole has a smoother rotation, thereby generating a relatively small noise. The outer wall 52 on each bearing 5 includes a longitudinally extending groove 55. The grooves 55 on the bearings 5 are not aligned with each other to provide multiple flow paths for the lubrication oil.

According to the above description, it is appreciated that the bearings are tightly secured to the inner periphery of the axle tube by means of the engaging portions such that only minor deformation occurs along the longitudinal length of the axle hole. Accordingly, the shaft pivotally held in the axle holes of the bearings has a smoother rotation. In addition, the inner periphery defining the axle hole of each bearing may include annular grooves to reduce friction between the shaft and the inner periphery defining the axle hole, thereby increasing the operating life of the motor.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. bearing structure for a motor rotor, the bearing structure comprising an inner wall defining an axle hole therein for pivotally supporting a shaft of the motor rotor, the bearing structure further including an outer wall and a connecting member interconnected between the inner wall and the outer wall, at least one annular groove being defined between the inner wall and the outer wall, wherein a longitudinal length of the axle hole is longer than that of the connecting member.

2. The bearing structure as claimed in claim 1, wherein the outer wall formed on the outer periphery of the bearing structure includes at least one longitudinally extending groove.

3. The bearing structure as claimed in claim 1, wherein the connecting member is located at a middle of the longitudinal length of the bearing structure.

4. The bearing structure as claimed in claim 1, wherein an inner periphery defining the axle hole of the bearing structure includes at least one annular groove.

5. A rotational supporting structure for a motor rotor, comprising:
an axle tube having an inner periphery;
a shaft; and
at least two bearings each including an outer wall tightly engaged to the inner periphery of the axle tube, each said bearing further including an inner wall defining an axle hole for pivotally supporting the shaft, a connecting member being interconnected between the inner wall and the outer wall, at least one annular groove being defined between the inner wall and the outer wall, a longitudinal length of the axle hole being longer than that of the connecting member.

6. The rotational supporting structure for a motor rotor as claimed in claim 5, wherein the outer wall of each said bearing includes at least one longitudinally extending groove, and wherein the longitudinally extending grooves on the bearings are not aligned with each other.

7. A bearing structure for a motor rotor, the bearing structure comprising:
a bearing with a cylindrical axle hole extending therethrough to form an inner periphery of the axle hole, the axle hole of the bearing adapted to pivotally support a shaft of a motor rotor;
the bearing comprising a rim on an outer periphery thereof the rim including an engaging portion extending outwardly from the rim, the engaging portion adapted to be engaged onto an inner periphery of an axle tube;
wherein a longitudinal length of the axle hole is longer than that of the engaging portion; and
wherein upon rotation of a shaft of a motor rotor, deformation of the inner periphery of the bearing occurs in a part of the bearing, substantially opposite the rim of the bearing.

8. The bearing structure as claimed in claim 7, wherein the engaging portion formed on the outer periphery of the bearing includes at least one longitudinally extending groove.

9. The bearing structure as claimed in claim 7, wherein the engaging portion is located at a middle of the outer periphery of the bearing.

10. The bearing structure as claimed in claim 7, wherein the inner periphery defining the axle hole of the bearing structure includes at least one annular groove.

11. A rotational supporting structure for a motor rotor, comprising:

an axle tube having an inner periphery;

a shaft of a motor rotor;

at least two bearings each with a cylindrical axle hole extending therethrough to form an inner periphery thereof, the at least two bearings each including a rim formed on outer periphery thereof, the rims each including an engaging portion that extends outwardly from respective one of the rims, the engaging portion being tightly engaged to the inner periphery of the axle tube;

each of the bearings comprising an axle hole for pivotally supporting the axle tube;

a longitudinal length of the axle hole being longer than that of the engaging portion; and wherein, upon rotation of the shaft of the motor rotor, deformation of the inner periphery of the bearing occurs in a part of the bearing substantially opposite the rim of the bearing.

12. The rotational supporting structure for a motor rotor as claimed in claim 11, wherein the engaging portion formed on the outer periphery of each said bearing includes at least one longitudinally extending groove, and wherein the longitudinally extending grooves on the bearings are not aligned with each other.

* * * * *